United States Patent Office 3,424,807
Patented Jan. 28, 1969

3,424,807
PURIFICATION OF ALKYL AROMATIC
HYDROCARBONS
Loyd W. Fannin, Dickinson, Tex., and Earle C. Makin,
Jr., St. Louis, Mo., assignors to Monsanto Company,
St. Louis, Mo., a corporation of Delaware
No Drawing. Filed Apr. 26, 1966, Ser. No. 545,273
U.S. Cl. 260—669       11 Claims
Int. Cl. C07c *15/10, 7/04*

The present invention relates to the separation and purification of aromatic hydrocarbons. More particularly, the present invention relates to the separation of vinyl aromatic hydrocarbons, i.e. styrene, from alkyl aromatic hydrocarbons, i.e. xylenes and ethylbenzene.

The term "vinyl aromatic hydrocarbons," as used herein, refers to aromatic hydrocarbons containing a monoethylenically unsaturated aliphatic substituent, e.g. styrene, alpha-methylstyrene, beta-methylstyrene, vinyl toluene, divinyl benzene. "Alkyl aromatic hydrocarbons" as used herein, refers to those aromatic hydrocarbons having saturated aliphatic substituents, e.g. xylenes, ethylbenzene and the like.

In the dehydrogenation of mixed alkylbenzene streams containing both xylenes and ethylbenzene to produce styrene, the product stream contains relatively large amounts of the xylenes as well as product styrene and unreacted ethylbenzene. By fractionation, the product stream may be divided into a styrene product stream containing some o-xylene and other products, an o-xylene stream containing styrene, some m- and p-xylenes and ethylbenzene as impurities and an ethylbenzene stream containing m- and p-xylene, as well as small amounts of o-xylene and styrene as impurities. The styrene stream may be subjected to further fractionation or other purification means to obtain high purity styrene. The ethylbenzene stream, of course, is usable as recycle to the dehydrogenation zone. In many instances, however, it is necessary or at least desirable to remove the last traces of styrene from this stream to prevent fouling of the reactor and catalyst. Often, the styrene cannot be removed economically because of the distillation efficiency required to remove the styrene. The o-xylene stream must be sold or otherwise disposed of for whatever value may be obtained from it. Its value for many uses is decreased by the presence of the styrene. Further fractionation of this stream, because of extremely high distillation efficiency necessary to remove the majority of the remaining styrene, is generally too costly. There is a need, therefore, for additional and more economical means of separating styrene from o-xylene.

It is an object of the present invention to provide a process for the separation and purification of aromatic hydrocarbons. A further object of the present invention is to provide a process for the separation of alkyl aromatic hydrocarbons from vinyl aromatic hydrocarbons. A particular object of the present invention is to provide a process for the purification of xylenes. Yet another particular object of the present invention is to provide a process for the separation of styrene from o-xylene. A further particular object of the present invention is to provide a process for the separation of alpha-methylstyrene and vinyl toluene from close boiling alkyl aromatic hydrocarbons. Additional objects will become apparent from the following description of the invention herein disclosed.

The present invention which fulfills these and other objects, is a process for the separation of vinyl aromatic hydrocarbons from alkyl aromatic hydrocarbons which comprises intimately contacting an aromatic hydrocarbon mixture containing vinyl aromatic hydrocarbons with a solvent solution comprised of a cuprous halide dissolved in an alkyl phosphite selected from the group consisting of dialkyl hydrogen phosphites and trialkyl phosphites, contacting the resulting solution of said aromatic hydrocarbon mixture in said solvent solution with an aliphatic hydrocarbon of 3 to 15 carbon atoms per molecule, allowing an extract and raffinate phase to form and thereafter separating said extract and raffinate phases and recovering a vinyl aromatic hydrocarbon enriched fraction from said extract phase and an alkyl aromatic hydrocarbon enriched fraction from said raffinate phase.

While the above arrangement of steps represents a particularly useful means of operating the present process, the present invention is not to be limited to such means. For example, the present process may be operated by simultaneously intimately contacting the hydrocarbon mixture to be separated, the solvent solution and the aliphatic hydrocarbon, allowing extract and raffinate phases to form and separating said extract and raffinate phases. Another means of carrying out the process of the present invention, is one which comprises concurrently and continuously introducing the hydrocarbon mixture to be separated and the solvent solution into an extraction column near the upper end of said column, continuously countercurrently contacting said hydrocarbon mixture and said solvent solution within said column with the aliphatic hydrocarbon, said aliphatic hydrocarbon being introduced into said column near the lower end of the column, and continuously removing an extract phase from the lower end of said column and a raffinate phase from the upper end of said column. Other means of carrying out the process of the present invention will be readily apparent to those skilled in the art. However, so long as the solvent solution of the present invention is used in combination with an aliphatic hydrocarbon of 3 to 15 carbon atoms, regardless of the order of use, to separate vinyl aromatic hydrocarbons and alkyl aromatic hydrocarbons, such use is within the scope of the present invention.

The process of the present invention provides a means whereby styrene, alpha-methylstyrene and other vinyl aromatics may be effectively separated from difficulty separable alkyl aromatic hydrocarbons.

In order to further describe and particularly to illustrate the present invention, the following examples are presented. These examples are not to be construed as limiting the present invention, however.

Example I

A solvent solution was prepared by dissolving 18.6 grams of cuprous chloride in 190 ml. of dimethyl hydrogen phosphite at 25° C. About 3.54 parts by weight of this solvent solution was then intimately mixed with one part by weight of a mixture of styrene and o-xylene at a temperature of about 25° C. The styrene o-xylene mixture was one containing 50.7% by weight styrene and 49.3% by weight o-xylene. On admixture of the hydrocarbon mixture with the solvent solution, the hydrocarbon completely dissolved. Normal hexane was then added to the mixture in increments equivalent to one-half part by volume of the hydrocarbon mixture until a hexane or raffinate phase was obtained containing a styrene-o-xylene mixture equal to about one-half of the volume of the original styrene-o-xylene mixture. The hexane or raffinate phase was then separated from the dimethyl hydrogen phosphite-cuprous chloride or extract phase. The aromatic hydrocarbon contained in each of the two phases was then recovered and analyzed. The following table presents the amount of styrene and o-xylene in the extract phase and the amount in the raffinate phase:

|  | Styrene | o-Xylene |
|---|---|---|
| Extract phase, wt. percent | 60.2 | 39.8 |
| Raffinate phase, wt. percent | 41.7 | 58.3 |

Example II

Example I was substantially repeated with the exception that after the styrene-o-xylene mixture was admixed with the dimethyl hydrogen phosphite-cuprous chloride solvent solution, the resulting mixture was cooled to about −20° C. This solution was then contacted with n-hexane at this temperature in the manner described in Example I. The raffinate phase and the extract phases were separated and the aromatic hydrocarbon recovered therefrom. The aromatic hydrocarbon from each of the phases was then analyzed. The results of the analysis are presented in the following table:

|  | Styrene | o-Xylene |
| --- | --- | --- |
| Extract phase, wt. percent | 62.0 | 38.0 |
| Raffinate phase, wt. percent | 42.6 | 57.4 |

Example III

A mixture of o-xylene and styrene in a volume ratio of 1:1 is continuously admixed at a temperature of about 30° C. with a solvent solution consisting of 92.5% by weight of dimethyl hydrogen phosphite containing 7.5% by weight of cuprous chloride dissolved therein. The o-xylene-styrene mixture and the solvent solution are admixed in a ratio by volume of about 5:1. The resulting mixture of o-xylene, styrene and solvent solution is continuously passed downward through a solvent extraction column of about 12 extraction stages. A stream of n-hexane is passed upwardly through the extraction column in countercurrent contact with the descending mixture of o-xylene, styrene and solvent solution. The contacting of the n-hexane with the mixture is at a temperature of about 30° C., the pressure being substantially atmospheric pressure. The amount of n-hexane introduced into the extraction column is about 4 times by volume the total volume of o-xylene and styrene introduced into the extraction column. A raffinate is continuously taken from the top of the extraction column, the raffinate consisting of n-hexane and aromatic hydrocarbons soluble therein. An extract phase is continuously removed from the bottom of the extraction column, the extract phase containing the dimethyl hydrogen phosphite-cuprous chloride solvent solution and the aromatic hydrocarbons soluble therein. The raffinate phase is continuously stripped of n-hexane and a raffinate aromatic hydrocarbon fraction recovered. This raffinate aromatic hydrocarbon fraction is substantially richer in o-xylene than the original hydrocarbon mixture. The aromatic hydrocarbons dissolved in the extract phase are recovered and found to be substantially richer in styrene than the original hydrocarbon mixture, containing styrene of greater than 98% purity.

The alkyl phosphite solvents useful in the solvent solutions of the present invention are dialkyl hydrogen phosphites and/or trialkyl phosphites. The alkyl radicals of the dialkyl and trialkyl phosphites may be the same or different. Further, the alkyl radicals may be straight-chain or branched-chain, but preferably are straight-chain. Most often the alkyl radical will contain 1 to 8 carbon atoms. Non-limiting examples of alkyl phosphites useful in the solvent solutions of the present invention are dimethyl hydrogen phosphite, diethyl hydrogen phosphite, dipropyl hydrogen phosphite, methyl ethyl hydrogen phosphite, ethyl propyl hydrogen phosphite, dipentyl hydrogen phosphite, methyl propyl hydrogen phosphite, trimethyl phosphite, triethyl phosphite, tributyl phosphite, dimethylethyl phosphite, diethylmethyl phosphite, dipropylethyl phosphite, triisopropyl phosphite, dibutyl hydrogen phosphite, dihexyl hydrogen phosphite, methyl hexyl hydrogen phosphite, ethyl hexyl hydrogen phosphite, propyl butyl hydrogen phosphite, and the like. The alkyl phosphites preferred in the practice of the process of the present invention are the dialkyl hydrogen phosphites and trialkyl phosphites in which the alkyl radicals have 1 to 6 carbon atoms and the alkyl radicals are straight-chain. Particularly useful alkyl phosphites for the practice of the process of the present invention are the dialkyl hydrogen phosphites having 1 to 2 carbon atoms in the alkyl radicals. Included in this group are dimethyl hydrogen phosphite, diethyl hydrogen phosphite, and methylethyl hydrogen phosphite.

The cuprous halide used in preparing the solvent solution of the present invention may include cuprous chloride, cuprous bromide, and cuprous iodide. Most often the cuprous halide will be either cuprous chloride or cuprous bromide with the cuprous chloride being the most preferred of the cuprous halides.

The amount of cuprous halide used in preparing the solvent solutions of the process of the present invention will vary somewhat depending upon the particular cuprous halide and alkyl phosphite used as a solvent therefor and, particularly the amount of vinyl aromatic hydrocarbons within the mixture to be separated. Usually, however, the amount of cuprous halide dissolved in the alkyl phosphite solvent will be such as to be in a weight ratio to the solvent within the range of 1:30 to 1:2. Preferably, however, the weight ratio of cuprous halide to alkyl phosphite solvent in the solvent solution will be in the range of 1:10 to 1:4.

The aliphatic hydrocarbons of 3 to 15 carbon atoms per molecule used in carrying out the process of the present invention most often are paraffinic hydrocarbons. These paraffinic hydrocarbons may be straight-chain, branched-chain, or cyclic. Non-limiting examples of such hydrocarbons are propane, n-butane, n-pentane, n-hexane, n-heptane, n-octane, n-nonane, n-decane, n-undecane, n-dodecane, n-tridecane, n-tetradecane, n-pentadecane, isobutane, isopentanes, isohexanes, isoheptanes, isononanes, isodecanes, isoundecanes, isododecanes, isotridecane and the like, cyclopentane, cyclohexane, methylcyclohexane, dimethylcyclohexane, cycloheptane, cyclooctane, dimethylcyclooctane, methylcycloheptane and the like. The most useful aliphatic hydrocarbons are the non-cyclic paraffin hydrocarbons of 4 to 7 carbon atoms per molecule.

The amount of aliphatic hydrocarbon of 3 to 15 carbon atoms used in the process of the present invention may vary considerably. The actual amount of aliphatic hydrocarbon used will depend to a great extent on the amount of alkyl aromatic hydrocarbons in the feed stream and the degree of separation desired. Usually, however, about 0.5 to 20 volumes of aliphatic hydrocarbon will be used per volume of alkyl aromatic hydrocarbon in the feed mixture to be separated. Preferably, however, about 1 to 15 volumes of the aliphatic hydrocarbon will be used per volume of alkyl aromatic hydrocarbon in the feed mixture which is to be separated by the process of the present invention.

The temperature at which the mixture of vinyl aromatic hydrocarbons and alkyl aromatic hydrocarbons is contacted with the alkyl phosphite-cuprous halide solvent solution is most often within the range from −30° to 50° C. Such temperatures are also employed in the contacting of the aliphatic hydrocarbon with the mixture of the alkyl phosphite-cuprous halide and the vinyl aromatic hydrocarbons and alkyl aromatic hydrocarbons. It is usually preferred that the temperatures at which the mixture of vinyl aromatic hydrocarbons and alkyl aromatic hydrocarbons is contacted with the alkyl phosphite-cuprous halide solvent solution be within the range of 15 to 35° C. The temperature at which the aliphatic hydrocarbon is contacted with the mixture of alkyl phosphite-cuprous halide solvent solution and vinyl aromatic hydrocarbons and alkyl aromatic hydrocarbons also is preferably within the range of 15 to 35° C.

The pressures at which the aromatic mixture to be separated is admixed with the solvent solution and thereafter the resulting mixture contacted with an aliphatic hydrocarbon may vary over relatively wide ranges. The pressure may vary from atmospheric pressure up to pressures as high as 100 p.s.i.g. and higher. In addition, subatmospheric pressures may be employed. One of the considerations in determining suitable pressures for carrying out the process of the present invention is the vapor pressure of the components of the mixture to be separated, the alkyl phosphite used and the aliphatic hydrocarbon used. It is generally preferred to operate the present process in the liquid phase.

The aromatic hydrocarbon mixtures which may be separated in accordance with the present invention are those containing vinyl aromatic hydrocarbons and alkyl aromatic hydrocarbons. While the present invention is operable in separating a wide range of such hydrocarbons, it is most practical for the separation of aromatic hydrocarbon mixtures containing vinyl aromatic hydrocarbons and alkyl aromatic hydrocarbons within the $C_8$ to $C_{12}$ range. The present invention is particularly useful and practical for the separation of styrene from close boiling o-xylene and a-methylstyrene and vinyl toluene from close boiling alkyl aromatic constituents.

What is claimed is:

1. A process for the separation of vinyl aromatic hydrocarbons from alkyl aromatic hydrocarbons which comprises intimately contacting an aromatic hydrocarbon mixture containing vinyl aromatic hydrocarbons and alkyl aromatic hydrocarbons with a solvent solution comprised of a cuprous halide dissolved in an alkyl phosphite selected from the group consisting of dialkyl hydrogen phosphites, and trialkyl phosphites, contacting the resulting solution of said aromatic hydrocarbon mixture in said solvent solution with an aliphatic hydrocarbon of 3 to 15 carbon atoms per molecule, allowing an extract and raffinate phase to form and thereafter separating said extract and raffinate phases.

2. The process of claim 1, wherein the cuprous halide is cuprous chloride.

3. The process of claim 1, wherein the alkyl phosphite is a dialkyl phosphite in which the alkyl radicals have 1 to 6 carbon atoms.

4. The process of claim 1, wherein the amount of cuprous halide in said solvent solution is in a weight ratio to the alkyl phosphite solvent within the range of 1:30 to 1:2.

5. The process of claim 1, wherein the aromatic hydrocarbon mixture is one containing vinyl aromatic hydrocarbons and alkyl aromatic hydrocarbons within the $C_8$ to $C_{12}$ range.

6. The process of claim 1, wherein the aliphatic hydrocarbon is a non-cyclic paraffin hydrocarbon of 4 to 7 carbon atoms per molecule.

7. The process of claim 1, wherein the amount of aliphatic hydrocarbon used is within the range of about 0.5 to 20 volumes of aliphatic hydrocarbon per volume of alkyl aromatic hydrocarbon in the feed mixture to be separated.

8. The process of claim 1, wherein the aliphatic hydrocarbon is intimately contacted with the solvent solution concurrently with the contacting of the aromatic hydrocarbon mixture with the solvent solution.

9. The process of claim 1, wherein said aromatic hydrocarbon mixture and said solvent solution are concurrently introduced into an extraction column wherein they are countercurrently contacted with said aliphatic hydrocarbon.

10. The process of claim 1, wherein the aromatic hydrocarbon mixture is one containing styrene and o-xylene, the cuprous halide is cuprous chloride, the alkyl phosphite is dimethyl hydrogen phosphite and the aliphatic hydrocarbon is a non-cyclic paraffin of 4 to 7 carbon atoms per molecule.

11. The process of claim 1, wherein the temperature at which the aromatic hydrocarbon mixture is contacted with the solvent solution is within the range of −30 to 50° C. and the temperature at which the resulting mixture of aromatic hydrocarbons and solvent solution is contacted with the aliphatic hydrocarbon is within the range of −30 to 50° C.

References Cited

UNITED STATES PATENTS

| | | | |
|---|---|---|---|
| 2,392,910 | 1/1946 | Franz | 260—669 |
| 2,973,394 | 2/1961 | Atkinson et al. | 260—669 |
| 3,017,346 | 1/1962 | Watson | 260—674 |
| 3,130,243 | 4/1964 | Dunn et al. | 260—674 |

DELBERT E. GANTZ, *Primary Examiner.*

C. E. SPRESSER, JR., *Assistant Examiner.*

U.S. Cl. X.R.

260—674; 208—324